United States Patent [19]

Steck

[11] Patent Number: 4,481,059

[45] Date of Patent: Nov. 6, 1984

[54] WINDOW PANEL REMOVAL METHOD

[75] Inventor: Mark A. Steck, Miamisburg, Ohio

[73] Assignee: Steck Manufacturing Co., Inc., Dayton, Ohio

[21] Appl. No.: 456,591

[22] Filed: Jan. 3, 1983

Related U.S. Application Data

[62] Division of Ser. No. 260,062, May 4, 1981, Pat. No. 4,417,398.

[51] Int. Cl.³ .............................................. B32B 31/18
[52] U.S. Cl. ..................................... 156/254; 156/344
[58] Field of Search ................. 30/116, 140; 156/254, 156/344; 219/233

[56] References Cited

U.S. PATENT DOCUMENTS

| | | | |
|---|---|---|---|
| 3,298,257 | 1/1967 | Goss | 81/3 |
| 3,372,459 | 3/1968 | Lambright | 29/401 |
| 3,711,677 | 1/1973 | Cummins | 219/221 |
| 4,199,852 | 4/1980 | Ayers | 29/239 |

Primary Examiner—Robert Dawson
Attorney, Agent, or Firm—H. Talman Dybvig

[57] ABSTRACT

A tool for use in the reciprocating manipulation of wire to cut through an adhesive compound supporting a replaceable item such as an automobile windshield comprises a handle portion from which projects a blade having a curved marginal wall having a trough along which the wire to be handled is permitted to extend. The tool is equipped with guide surfaces to facilitate location of the wire into its trough and with lock nut means for anchoring a free end of the wire at a location convenient to the guiding action of said guide surfaces.

1 Claim, 5 Drawing Figures

WINDOW PANEL REMOVAL METHOD

This application is a division of application Ser. No. 260,062, filed May 4, 1981, now U.S. Pat. No. 4,417,398.

BRIEF SUMMARY OF THE INVENTION

A wire handling tool comprises a handle, anchor means on said handle for anchoring a wire to said handle and blade means projecting outwardly from said handle for guiding wire extending outwardly of said handle from said anchor means. For accomplishment of its wire guiding function, the blade means has a curved side wall along which extends a trough or groove into which the wire to be guided by said blade means is seated so as not readily to fall off said side wall. The handle includes shelf means interposed between said anchor means and said blade means and occupying a plane spaced from the center of said trough to guide wire slid on said shelf means into seating relation with said trough. The wire handling tool is preferably produced in pairs which are mirror image opposites, one being primarily suited for left-hand manipulation and the other being primarily suited for right-hand manipulation. The configuration of the tool is well-suited to the removal of adhesively mounted stationary windows, such as automobile windshields and automobile back-windows, the tools giving rise to a novel method of window removal in which a single wire engaged by paired tools is drawn reciprocally along window surfaces as opposed to window edges.

DETAILED DESCRIPTION

Figure 1:
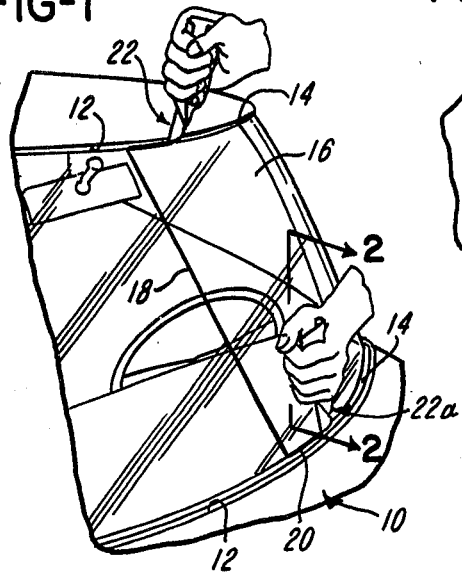
FIG. 1 is a fragmentary perspective view of the vehicle and the invention in use on the vehicle.

FIG. 1 is a schematic illustration of the windshield area of an automobile body 10 of current style. The trim and hardware near the window area, such as windshield wiper arms and garnish, having been removed. The trim removal exposes a channel 12 surrounding the front window opening. A windshield panel 16 has been caulked with an adhesive caulking compound 14 which, being sandwiched between a ledge of the channel and the confronting panel surface, adhesively retains the panel 16 in position. This type of windshield mounting is conventional and is of interest to the present invention because the adhesive caulking compound so mounts the panel 16 so that it remains possible to force small tools or wires through the adhesive caulking compound so as to extend between the inside and the outside of the vehicle passenger compartment without damage to the glass of the panel 16.

Panel mountings, such as described, ordinarily remain secure throughout the life of the vehicle. However, the possibility of passing a wire, or the like, through the adhesive caulking compound has also led to the development of techniques for panel removal in which the adhesive material lying between the glass panel and the metal forming the window channel is cut, or otherwise parted, to allow the panel to be removed and replaced. These techniques are sometimes employed for the replacement of damaged panels or the removal in salvage operations of undamaged panels and sometimes for the replacement of undamaged panels with other panels which may have a different tint or hue.

U.S. Pat. No. 3,372,459 issued to Lambright thus describes the use of a length of strong wire passed through the bonding material extending along opposite sides of a window panel and engaged at its opposite ends by handgrips which allow the wire to be reciprocated in a see-saw fashion so as to cut through the bonding material extending along the opposite sides of the window panel.

A difficulty sometimes encountered with this type of procedure is that the wire is reciprocated across the free edges of the windshield panel as the wire is biased lengthwise along such free edges and even minor nicks or cracks at such free edges can snag or cut the wire with the windshield removal being unreasonably delayed in the first instance and the cutting wire broken before windshield removal has been completed in the second instance. Additionally, if the windshield is being removed because already broken, there will be a tendency for the wire to follow the course of cracks in the glass and thus stray away from the free edges of the glass where one would seek to accomplish the cutting action.

With the present invention comparable difficulties are eliminated by the use of wire guiding tools which allow the cutting wire to be reciprocated in directions parallel to the free edges of the panel rather than in directions which draw the wire across the free edges of the panel.

Figure 2:
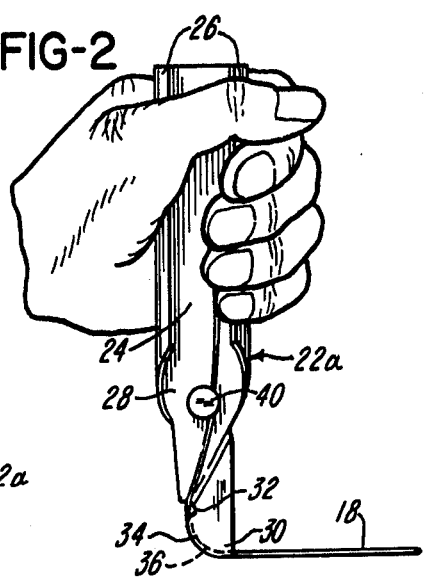
FIG. 2 is a fragmentary side elevation view taken along line 2—2 of FIG. 1.

A wire guiding tool in accordance with the present invention is identified by the reference number 22 in the drawings. A companion tool which is of the same construction but arranged oppositely in the sense of a mirror image is also identified by the reference number 22a. Referring to FIG. 2 of the drawings, the tool 22a can be seen to comprise a sheet member formed to have a handle portion 24 having flanking side walls 26 which are curved for comfortable gripping of the handle portion 24 by the hand of a user.

Projecting outwardly from one end of the handle portion 24 is a shelf portion 28 and projecting outwardly from the shelf portion 28 is a blade portion 30. The handle portion 24, shelf portion 28 and blade portion 30 are preferably shaped as by stamping from a single sheet of material, such as a metal or a plastic, having a uniform thickness before the shaping of the sheet material as it appears in the tool 22a.

The tool 22a, after being shaped, can be seen to be substantially flat along the major surfaces of the shelf 28, except where the side walls 26 curve upwardly from the shelf portion 28. The blade portion 30, while also flat, can be seen, however, to have been set upwardly from the plane of the shelf portion 28 while the major surfaces of the blade 30 remain generally parallel to but spaced above the corresponding surfaces of the shelf 28.

The blade 30 can be seen to have a curved working wall 34 along which extends a recessed groove or trough 36. In order to facilitate the formation of this groove as by grinding, a relief notch 32 has been cut between the wall 34 and the shelf 28, the notch 32 allowing the groove 36 to be ground all the way to the trailing edge of the blade where the notch 32 is located.

Figure 4:
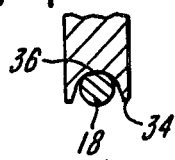
FIG. 4 is a greatly enlarged cross-section taken along the line 4—4 of FIG. 3.

The groove 36 has been formed to cradle a wire, such as the wire 18 illustrated in FIG. 1. This wire 18, which is desired to have good tensile strength, may be a length of piano wire. In general, the groove or trough 36 will have a depth approximating the diameter of the piano wire, although the piano wire may, of course, be larger or smaller in diameter in reference to the depth of the groove 36 than is indicated in FIG. 4. As evident in FIG. 4, the thickness of the blade 30 ordinarily exceeds the diameter of the piano wire. Likewise, the distance by which the major surfaces of the blade 30 have been displaced upwardly from the major surfaces of the shelf 28 will ordinarily exceed the diameter of the piano wire. It will be appreciated, however, that the described dimensional relationships are only approximate relationships and are not critical to the practice of the present invention.

Figure 5:
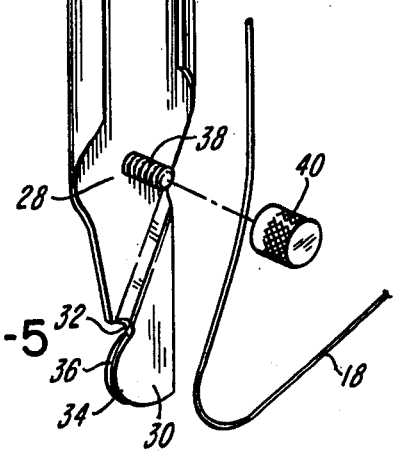
FIG. 5 is an exploded perspective view of the wire guiding tool.

Welded, brazed or otherwise affixed to the shelf 28 at a central location is a threaded stud 38, best seen in FIG. 5, engaged by an internally threaded lock nut 40. The lock nut 40 is rotatable on to the stud 38 to cause the leading surface of the nut to bear against the flat surface of the shelf 28 surrounding the stud 38. The stud 38 and nut 40 thus act together as a clamp or vice mechanism, by means of which a portion of the wire 18 lying alongside the stud 38 can be positively clamped or anchored between the nut 40 and the shelf 28.

FIG. 2 shows the wire 18 so anchored and it can be noted that the shelf 28 provides a convenient surface upon which the wire 18 can be slid to enter the groove 36. Thus the shelf 28 provides a surface for guiding the wire 18 into the groove 36. Also, the groove 36, when cradling the wire 18, constitutes a means to prevent sliding of the wire 18 off the wall 34 of the blade portion 30.

Figure 3:
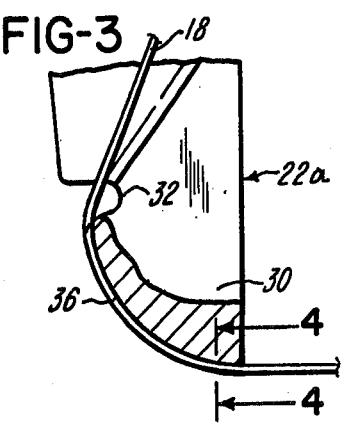
FIG. 3 is an enlarged fragmentary elevation view with parts broken away of the ends of the wire guiding tool.

The tool 22a, as illustrated in FIG. 2, is best suited for use in the left-hand of the operator where the side walls 26 protect the operator's fingers from engagement with the wire 18. The tool 22, appearing in FIG. 1, is a mirror image construction of the tool 22a, appearing in greater detail in FIGS. 3, 4 and 5, and is suited for use in the operator's right-hand. FIG. 1 thus shows tools 22 and 22a in the respective right and left-hands of an operator.

In the utilization of the tools of the present invention, a length of the wire 18 which is approximately 10" oversize with respect to the width of the window panel which is to be removed from an automobile body is cut. A first end of the wire, the end 20 for example, is pressed remotely from its extreme end through the compound 14 by a suitable piercing tool, not shown. This action pushes an open loop of the wire through the compound adjacent the window pane. If the piercing progressed from the vehicle body inwardly, the open loop of wire thus presented to the interior of the vehicle would then be grabbed by a suitable tool, such as needle-nose pliers, to pull all but approximately 5" of the wire into the interior of the vehicle. The free end of the wire inside the vehicle would then be pressed through the adhesive caulking compound on the opposite side margin of the window pane to produce a second loop of the wire with this loop now projecting outwardly of the vehicle, whereas the first formed loop projected inwardly of the vehicle. The second loop is then grabbed from the outside by a tool such as pliers to pull approximately 5" of the wire from within the passenger compartment to a location outside the passenger compartment. As indicated in FIG. 1, these operations can be used to place the wire 18 inside the passenger compartment so as to extend from top to bottom of a windshield panel to be removed and can provide approximately 5" of wire projecting outwardly from both the top and bottom portions of the channel in which the windshield panel has been mounted.

Working from the outside of the vehicle, the operator now securely attaches the tools 22 and 22a to the free ends of the wire using the lock nuts of such tools. When the free ends are thus attached, there may be an inch or so of loose wire extending away from each of the lock nuts 40 which serve as anchors for the wire 18. Due to the oversize in the length of the wire 18 with which the work is started, there will be some three or four inches of wire extending from each anchoring lock nut 40 to the point of entry of the wire 18 to the interior of the vehicle. With hand movements of the tools 22 and 22a, the wire is guided along the shelves 28 into the grooves 36 from where the opposite end portions of the wire pass under the blades 30 toward their respective points of entry to the interior of the vehicle.

With the operator grasping the tools as illustrated in FIG. 1, the blades 30 are pressed inwardly of the channel which has received the window panel 16 while pulling the wire 18 taut. By relaxing one arm and then increasing pull with the other arm, and then repeatedly reversing his relaxation in pulling from arm to arm, always keeping the blades 30 within the window channel, the operator is able to reciprocate the wire 18, causing the wire to progress in the rightward direction as seen in FIG. 1, such progression occurring as the wire progressively cuts through the adhesive caulking compound securing the right half of the window panel in the channel 12. As the wire thus progresses fully to the right side of the window panel, the operator may commence to move his right-hand downwardly, continuing the reciprocating movements, as he returns his left-hand toward the central portion of the window opening, thus to completely free the right half of the window panel. Thereafter the operator may return the wire to the approximate position illustrated in FIG. 1, reverse the handles 22 and 22a, move himself to the opposite side of the automobile and complete the window removal by pulling the wire to the left as it appears in FIG. 1, thus to complete the cutting of the caulking compound and to totally free the window pane from its opening.

It will be noted that generally throughout the reciprocating arm actions which cause the wire 18 to cut through the caulking compound, the wire 18 is held by the tools 22 and 22a in a generally U-shaped configuration in which the ends of the U-shaped wire configuration anchored to the tools 22 and 22a are held with aid of such tools in planes parallel to the major surfaces of the panel being removed. Thus the entire U-shaped wire configuration achieved with aid of the tools 22 and 22a is retained generally in a plane or planes generally parallel to the major surfaces of the panel being removed. Since the U-shaped wire configuration remains generally parallel to the major panel surfaces, the wire 18 is not biased against the free edges of the panel and, thus, is not urged to enter cracks or chipped edges at the free edge of the window panel.

While for the purposes of describing a preferred manner in which the tools of the present invention can be used, it is to be appreciated that tool utilization is a matter of operator preference and convenience. Thus FIG. 1 suggests that the operator may prefer to hold the tools of the present invention toward himself. Another operator may prefer to push the tools away from himself and other operators may prefer to work in combinations wherein one operator controls one tool and a companion controls another tool. Furthermore, instead of reversing tools when the caulking compound securing one half of a window panel has been cut free, an operator may accomplish essentially the same benefit merely by rotating the left-hand tool about its own longitudinal axis for gripping with his right-hand and likewise rotating the right-hand tool for gripping with his left-hand.

While the present invention has been described with reference to window panel removal, particularly in the environment of an automobile vehicle, it can be appreciated that the tools and methods described in this application have a wide range of application, not limited to automobile vehicles and window panels.

Although the preferred embodiment of this invention has been described, it will be understood that various changes may be made within the scope of the appended claims.

Having thus described my invention, I claim:

1. The method of removing a window panel secured by an adhesive compound to channel means generally surrounding the margins of said panel comprising the steps of extending a wire through the compound at opposite margins of said panel and across one face of said panel between said opposite margins and progressively cutting said compound by reciprocating the ends of said wire in planes generally parallel to the major faces of said panel and by the same reciprocation in directions generally parallel to the free edges of said panel.

* * * * *

UNITED STATES PATENT AND TRADEMARK OFFICE
CERTIFICATE OF CORRECTION

PATENT NO. : 4,481,059
DATED : November 6, 1984
INVENTOR(S) : MARK A. STECK

It is certified that error appears in the above-identified patent and that said Letters Patent are hereby corrected as shown below:

On the front page, in brackets 22 the filing date should be ---January 7, 1983---.

Signed and Sealed this

Thirtieth Day of April 1985

[SEAL]

Attest:

DONALD J. QUIGG

Attesting Officer     Acting Commissioner of Patents and Trademarks